(12) United States Patent
Jakharia et al.

(10) Patent No.: US 12,314,244 B1
(45) Date of Patent: May 27, 2025

(54) SYSTEMS AND METHODS FOR BLOCKCHAIN-BASED CLOUD STORAGE DOCUMENT INTEGRITY

(71) Applicant: Egnyte, Inc., Mountain View, CA (US)

(72) Inventors: Chirag Jakharia, Mumbai (IN); Umang Bhate, Pune (IN); Sachin Shetty, Mumbai (IN)

(73) Assignee: Egnyte, Inc., Mountain View, CA (US)

( * ) Notice: Subject to any disclaimer, the term of this patent is extended or adjusted under 35 U.S.C. 154(b) by 0 days.

(21) Appl. No.: 18/200,442

(22) Filed: May 22, 2023

Related U.S. Application Data

(60) Provisional application No. 63/348,881, filed on Jun. 3, 2022.

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC .......... G06F 16/22; G06F 16/23; G06F 16/25; G06F 16/2365; G06F 16/27; G06F 16/273; G06F 16/275; G06F 16/278
USPC .......................................................... 707/697
See application file for complete search history.

(56) References Cited

U.S. PATENT DOCUMENTS

| | | | |
|---|---|---|---|
| 10,261,711 B1 * | 4/2019 | Pasirstein | H04L 9/0637 |
| 11,271,751 B2 * | 3/2022 | de Matos | G06F 21/6218 |
| 2018/0046889 A1 * | 2/2018 | Kapinos | G06F 16/93 |
| 2019/0250929 A1 * | 8/2019 | Pasirstein | G06F 21/602 |
| 2022/0078008 A1 * | 3/2022 | Kong | G06F 21/645 |

* cited by examiner

*Primary Examiner* — Michael Pham
(74) *Attorney, Agent, or Firm* — Pierson Ferdinand, LLP; Jeffrey R. Ambroziak

(57) ABSTRACT

Embodiments are directed to the protection and verification of documents. In some embodiments, this is achieved by generating checksum data describing a document and storing that and a time stamp on a publicly available blockchain. By recording a checksum of a document on a blockchain, the disclosed systems and methods may be used later to validate the integrity of the document. In one embodiment, this validation is performed by comparing the recorded checksum from a previous time when the document or files were stored to a recalculated checksum generated at the present time. If the checksums match, then it is assumed that the document has not been altered since the checksum data was first calculated.

18 Claims, 4 Drawing Sheets

SYSTEMS AND METHODS FOR BLOCKCHAIN-BASED CLOUD STORAGE DOCUMENT INTEGRITY

CROSS REFERENCE TO RELATED APPLICATION

This application claims the benefit of U.S. Provisional Application No. 63/348,881, filed Jun. 3, 2022, entitled "Systems and Apparatuses for Blockchain-Based Cloud Storage Document Integrity", the disclosure of which is incorporated, in its entirety (including the Appendix) by this reference.

BACKGROUND

Documents are used in many business situations to define an agreement, provide proof of an event, or communicate information. In such situations, it is important that the data and information contained in a document be verifiable as being what was intended by the creator of the document. This can sometimes be accomplished by verifying that a document is as intended and has not been tampered with or otherwise unknowingly altered. In this context, document integrity relates to an assurance that a digital document has not been altered by an unauthorized party.

Document integrity is essential for business processes, legal department operations, compliance and regulatory concerns, and in general, an activity that involves multiple parties. The integrity of a document may be left to a central institution that stores the document. Unfortunately, if the security of the central institution cannot be fully relied upon (e.g., due to the potential of internal bad actors, security failures, or storage errors), the integrity of documents stored by the institution may be at risk, or at least, uncertain.

Document integrity is sometimes inferred by affixing an indicator of authenticity to a document, such as applying a "stamp" associated with an institution (e.g., a government agency or bank). Such a stamping process is supposedly subject to security controls at the institution; however, as evidenced from incidents in the past, such efforts are not tamper-proof.

Conventional approaches to determining if a digital version of a document is authentic typically involve a digital document stored within a central data store. This has the disadvantage that if the document changes, then a checksum will change, and a user cannot be guaranteed that the document is as originally stored (as all data is under control of the software developer/vendor).

Embodiments of the systems and methods described herein are directed to solving these and related problems individually and collectively.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

The present disclosure is generally directed to the digital "stamping" of documents by committing checksum data describing the documents to a blockchain. By recording a checksum of a document to the blockchain, the systems and methods disclosed and/or described herein may later validate the integrity of the document (e.g., by comparing the recorded checksum to a recalculated checksum, thereby demonstrating that the document has not been altered since the checksum data was first calculated). Thus, these systems and methods may allow a document owner to trust that a document has not been tampered with without requiring trust in the party that stores the document. This provides a benefit compared to conventional approaches as a publicly available blockchain stores an upload timestamp which cannot be changed since it is stored in a decentralized architecture, providing a user with assurance the checksum stored in the blockchain and associated with the original document is not changed.

In some embodiments, the disclosed system and methods may comprise elements, components, or processes that are configured and operate to provide one or more of the following:
  accessing an electronically stored data set;
  generating a checksum of the accessed data set;
  creating a payload comprising
    the generated checksum of the data set; and
    an identifier for the data set; and
  committing a transaction comprising the payload to a
    blockchain.

In one embodiment, the system may include a set of computer-executable instructions, a memory or data storage element containing the set of instructions (such as one or more non-transitory computer-readable media), and one or more electronic processors or co-processors. When executed by the processors or co-processors, the instructions cause the processors or co-processors (or a device or apparatus of which they are part) to perform a set of operations that implement an embodiment of the disclosed method or methods.

In one embodiment, the disclosure is directed to one or more non-transitory computer-readable media including a set of computer-executable instructions, wherein when the set of instructions are executed by one or more electronic processors or co-processors, the processors or co-processors (or a device or apparatus of which they are part) perform a set of operations that implement an embodiment of the disclosed method or methods.

Other objects and advantages of the systems, apparatuses, and methods disclosed will be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and are described in detail herein. However, the embodiments are not intended to be limited to the exemplary or specific forms described. Rather, the disclosure covers all modifications, equivalents, and alternatives falling within the scope of the appended claims.

BRIEF DESCRIPTION OF THE DRAWINGS

Embodiments of the disclosure are described with reference to the drawings, which illustrate a number of exemplary embodiments and are a part of the specification. Together with the following description, the drawings demonstrate and explain various principles of the present disclosure.

Note that the same numbers are used throughout the disclosure and figures to reference like components and features.

DETAILED DESCRIPTION

Figure 1:
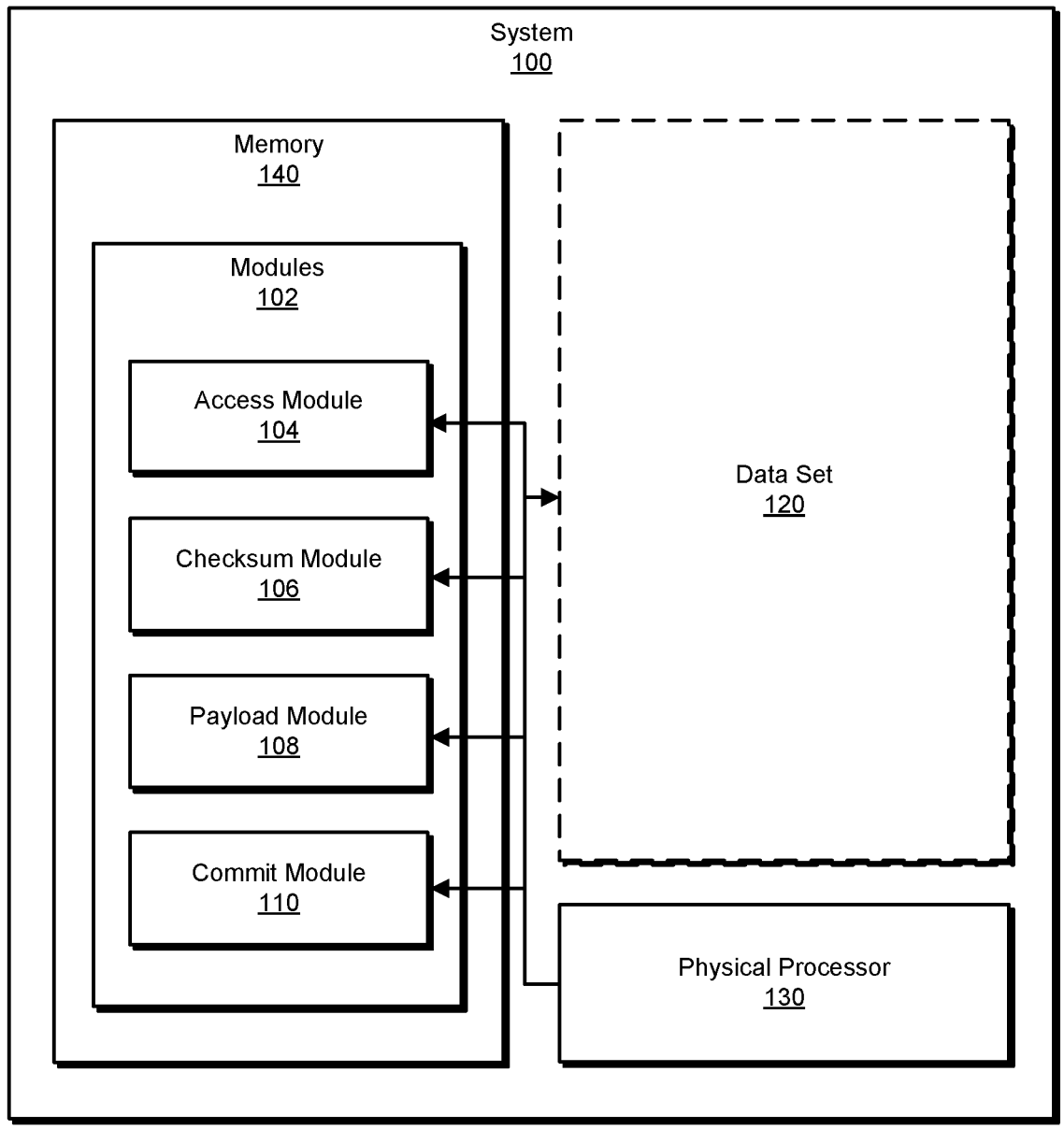
FIG. 1 is a block diagram illustrating an example apparatus or system 100 for implementing a method to provide blockchain-based cloud storage document or data set integrity, in accordance with an embodiment of the disclosure.

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosed subject matter will be described more fully herein with reference to the accompanying drawings, which show by way of illustration, example embodiments by which the disclosed systems, apparatuses, and methods may be practiced. However, the disclosure may be embodied in different forms and should not be construed as limited to the embodiments set forth herein; rather, these embodiments are provided so that this disclosure will satisfy the statutory requirements and convey the scope of the disclosure to those skilled in the art.

Among other forms, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods disclosed and/or described herein may be implemented by a suitable processing element or elements (such as a processor, microprocessor, co-processor, CPU, GPU, TPU, QPU, state machine, or controller, as non-limiting examples) that are part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory computer-readable media or data storage elements. In some embodiments, the set of instructions may be conveyed to a user over a network (e.g., the Internet) through a transfer of instructions or an application that executes a set of instructions.

In some embodiments, the systems and methods disclosed and/or described herein may provide services to end users through a SaaS or multi-tenant platform. The platform provides access to multiple entities, each with a separate account and associated data storage. Each account may correspond to a user, a set of users, an entity, a set or category of entities, a set or category of users, a set or category of data, an industry, or an organization, for example. Each account may access one or more services (such as applications or functionality), a set of which are instantiated in their account, and which implement one or more of the methods, process, operations, or functions disclosed and/or described herein.

In some embodiments, one or more of the operations, functions, processes, or methods disclosed herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

Document integrity relates to assuring that a stored digital version of a document has not been tampered with or otherwise (even unknowingly) altered. Document integrity is a key part of many business, legal, compliance, and other processes involving multiple parties. The integrity of a document may be left to a central institution that stores the document. Unfortunately, if the central institution cannot be fully trusted (e.g., due to the potential of internal bad actors, security failures, or storage errors, as examples), then the integrity of documents stored by the institution may be at risk, or at least be uncertain.

Embodiments of the disclosure are generally directed to the protection and verification of documents. In some embodiments, this is achieved by generating checksum data describing a document and storing that and a time stamp on a publicly available blockchain. By recording a checksum of a document on a blockchain, the disclosed systems and methods may be used later to validate the integrity of the document. In one embodiment, this validation is performed by comparing the recorded checksum from a previous time when the document or files were stored to a recalculated checksum generated at the present time. If the checksums match, then it is assumed that the document has not been altered since the checksum data was first calculated.

Embodiments of the disclosed systems and methods allow a document owner to trust that a document has not been tampered with without explicitly requiring trust in the party that stores the document. This capability means that a document owner can independently select the data storage architecture that best suits their needs, and then overlay the document verification capability of an embodiment of the disclosure onto that document storage solution to provide a complete document storage and document (or other data) protection solution.

In the context of this disclosure, a public blockchain is a distributed ledger, representing a set of immutable records that may be read but not modified. Thus, a transaction that is recorded on the blockchain cannot be tampered with. In some embodiments, such a transaction may include a checksum generated from a document or set of data and one or more of a date of a transaction and a location of a copy of the document or set of data. Use of a blockchain allows digital information to be recorded and distributed, but not edited. In this way, a blockchain provides a foundation for an immutable ledger or record of transactions that cannot be altered, deleted, or destroyed.

As mentioned, the advent of public cloud storage for documents and data has further complicated concerns regarding document and data integrity. One example of a common concern is that of a document stored with a cloud vendor in the past, and whether the content of the document is the same as when it was originally uploaded and stored (and hence has not been accidentally or intentionally corrupted or tampered with).

Since a blockchain provides an immutable public ledger which can be read and verified, it also provides a robust and tamper proof method to (in effect) "stamp" a document (or data set). Using blockchain in the manner disclosed, an embodiment enables a user to verify that the contents of a document stored in a public cloud is the same as it was when it was first uploaded and stored.

FIG. 1 is a block diagram illustrating an example apparatus or system 100 for implementing a method to provide blockchain-based cloud storage document or data set integrity, in accordance with an embodiment of the disclosure. As illustrated in the figure, example system 100 (which may take the form of a platform, apparatus, or device) may include one or more modules 102 that include computer-executable instructions that when executed by a suitable processor, cause the system to perform one or more functions, operations, processes, or tasks.

For example, and as will be explained in greater detail herein, example system 100 may include an access module 104 that causes system 100 to access a data set 120. As a non-limiting example, data set 120 may comprise one or more documents. Data set 120 may be stored as part of system 100 or otherwise be accessible to system 100. System 100 may additionally include a checksum module 106 that causes system 100 to generate a checksum of data set 120. System 100 may additionally include a payload module 108 that causes system 100 to create a payload including the checksum of data set 120 and one or more of (a) a time stamp of when the checksum was generated and (b) an identifier of a stored instance of the data set. The identifier may be a document or data set ID or an address of a location of a copy of the document or data set (such as a URL, which may also function as an ID). System 100 may also include a commit module 110 that causes system 100 to commit a transaction including the payload to a public blockchain.

Although illustrated as separate elements, one or more of modules 102 in FIG. 1 may represent portions of a single module or application. Further, one or more of modules 102 may be resident in and contain instructions executed by a system, platform, apparatus, or device, where the apparatus or device may be a local device in communication with a remote data storage system or platform.

Figure 2:
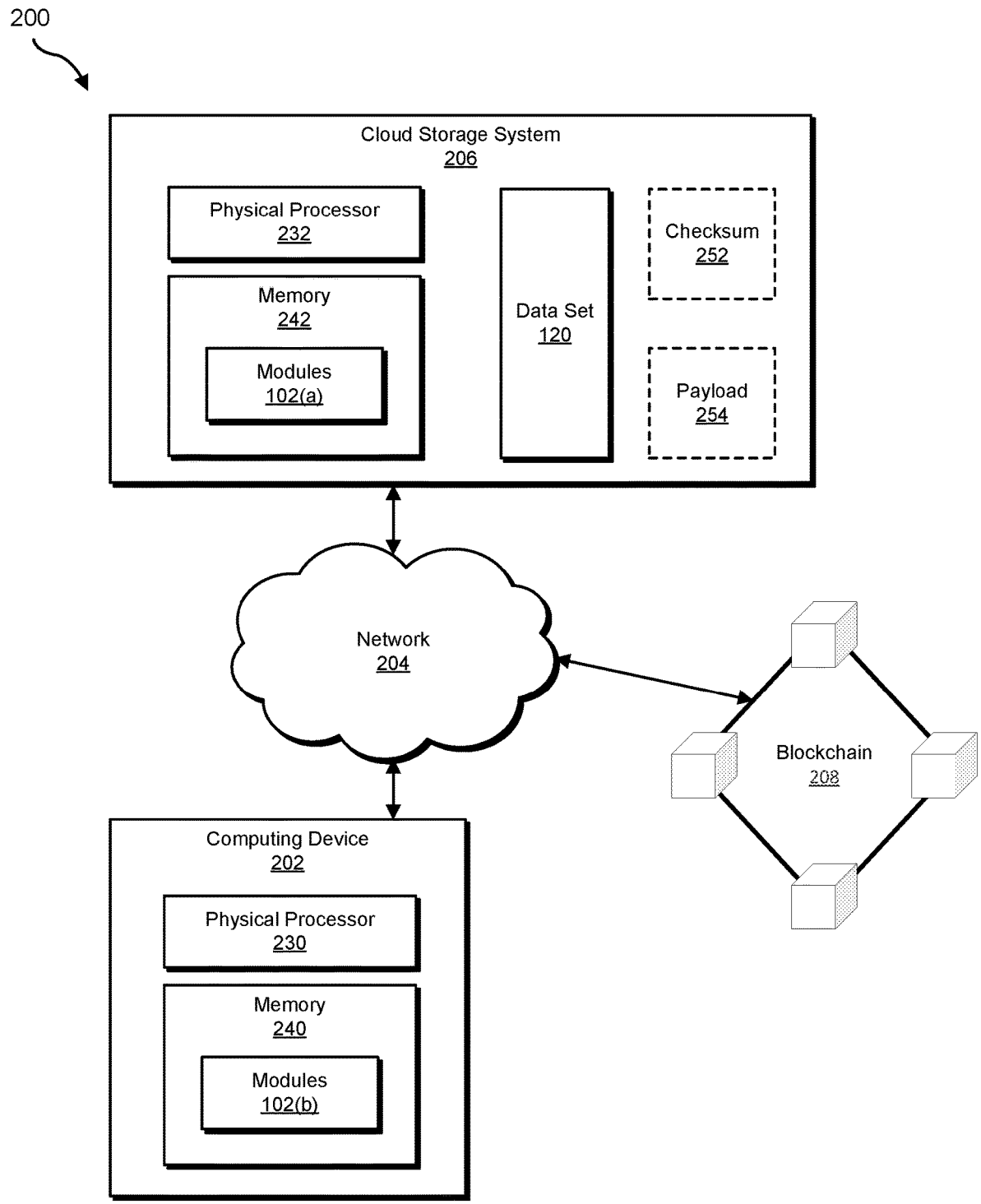
FIG. 2 is a block diagram illustrating an example system comprising a local computing device, cloud storage system, and blockchain for implementing an embodiment of the disclosed system and method for providing blockchain-based cloud storage document integrity.

For example, one or more of modules 102 may represent modules containing computer-executable instructions that are configured to be executed by one or more computing devices, such as computing device 202 and/or cloud storage system 206 in FIG. 2. In some embodiments, one or more of modules 102 in FIG. 1 may represent all or portions of one or more special-purpose computers configured to perform one or more tasks.

As illustrated in FIG. 1, system 100 may include one or more memory components or devices, such as memory 140. Memory 140 generally represents a type or form of volatile or non-volatile storage device or medium capable of storing data and/or computer-readable instructions. In one example, memory 140 may be used to store, load, and/or maintain one or more of modules 102 (typically under control of an operating system). Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or other suitable electronic storage memory.

As illustrated in FIG. 1, system 100 may also include one or more physical processors, such as physical processor 130. Physical processor 130 generally represents a type or form of hardware-implemented processing unit capable of interpreting and/or executing a set of instructions. In one example, physical processor 130 may access and/or modify one or more of modules 102 stored in memory 140. Additionally or alternatively, physical processor 130 may execute one or more of modules 102 to facilitate enforcing a data loss prevention (DLP) policy on an endpoint device.

Non-limiting examples of physical processor 130 include microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or other suitable electronic physical processor.

As illustrated in FIG. 1, system 100 may also include (or have access to) a data set 120. As disclosed and/or described herein, data set 120 may generally represent digitally stored data, including (as a non-limiting example) a digital version of a document or a group of documents.

System 100 in FIG. 1 may be implemented in a variety of ways. For example, all or a portion of system 100 may represent portions of system 200 in FIG. 2. As shown in FIG. 2, system 200 may include a computing device 202, a cloud storage system 206, and a blockchain 208, with computing device 202 and/or cloud storage system 206 able to communicate and transfer data to or from blockchain 208 (and/or access blockchain 208 to read data) via a network 204.

In one non-limiting example, all or a portion of the functionality of modules 102 (e.g., modules 102(*a*) of FIG. 2) may be performed by cloud storage system 206. Additionally (or alternatively), all or a portion of the functionality of modules 102 (e.g., modules 102(*b*) of FIG. 2) may be performed by computing device 202. Further, all or a portion of the functionality of modules 102 may be performed by other suitable computing system.

As disclosed and/or described herein, one or more of modules 102 from FIG. 1 may, when executed by at least one processor of computing device 202 and/or cloud storage system 206, enable validation of the integrity of data set 120. For example, in one embodiment, access module 104 (which may be executed by a processor in a cloud storage system) may function to access data set 120 that is stored by cloud storage system 206. Checksum module 106 may then function to generate a checksum 252 of data set 120. Payload module 108 may then function to generate a payload 254 that includes checksum 252 and a document identifier and/or an identifier of a stored instance of data set 120 (e.g., an identification string used by cloud storage system 206 in storing data set 120 and/or a location where data set 120 is stored). Commit module 110 may then function to commit payload 254 to a public blockchain 208.

Computing device 202 (which is typically a user's local device) represents a type or form of computing device capable of reading and executing computer-executable instructions. In some embodiments, computing device 202 may be a portable endpoint device such as a laptop, mobile phone, or tablet. Additional examples of computing device 202 include, without limitation, desktops, servers, cellular phones, Personal Digital Assistants (PDAs), multimedia players, embedded systems, wearable devices (e.g., smart watches or smart glasses), smart vehicles, smart packaging (e.g., active or intelligent packaging), gaming consoles, Internet-of-Things devices (e.g., smart appliances), variations or combinations of one or more of the same, and/or other suitable computing device.

Network 204 generally represents a medium or architecture capable of facilitating communication and/or data transfer between devices and systems. In one example, network 204 may facilitate communication between computing device 202 and cloud storage system 206, between cloud storage system 206 and blockchain 208, and/or between computing device 202 and blockchain 208. Network 204 may facilitate communication and/or data transfer using wireless and/or wired connections. Non-limiting examples of network 204 include an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or other suitable network.

As mentioned, cloud storage system 206 represents a type or form of computing device (or system or platform) that can provide remote data storage. In some examples, cloud storage system 206 may be a cloud server. Additional non-limiting examples of cloud storage system 206 include storage servers, database servers, application servers, and/or web servers configured to execute software applications and/or provide storage, database, and/or web services.

Although illustrated as a single entity in FIG. 2, cloud storage system 206 may include and/or represent multiple servers that work and/or operate in conjunction with one another. As another non-limiting example, cloud storage system 206 may be implemented in the form of a multi-tenant platform, typically used to provide Software-as-a-Service (SaaS) to end users.

Figure 3:
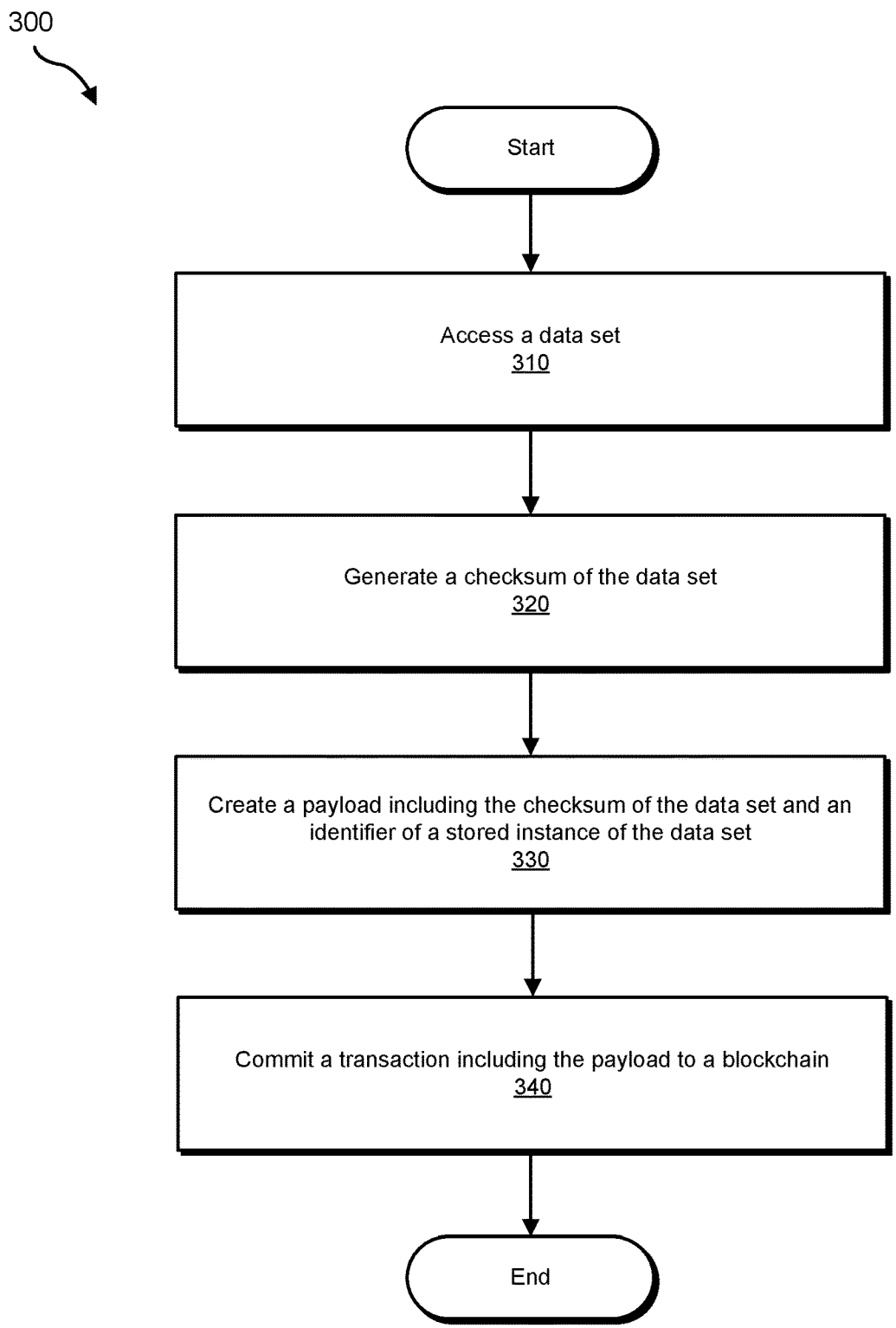
FIG. 3 is a flow chart or flow diagram illustrating steps, stages, operations, functions, or processes that may be implemented as part of an embodiment of the disclosed method for providing blockchain-based cloud storage document integrity.

FIG. 3 is a flow chart or flow diagram illustrating steps, stages, operations, functions, or processes that may be implemented as part of an embodiment of the disclosed method for providing blockchain-based cloud storage document integrity. The steps, stages, operations, functions, or processes shown in FIG. 3 may be performed by a computing device or system configured to execute suitable computer-executable code, including system 100 in FIG. 1, system 200 in FIG. 2, and/or variations or combinations of one or more of the same. In one non-limiting example, each of the steps or stages shown in FIG. 3 may represent an algorithm or logic flow whose structure includes and/or is represented by multiple sub-steps, examples of which are described in greater herein.

As illustrated in FIG. 3, at step 310, one or more of the systems disclosed and/or described herein may access a data set or cause a data set to be accessed. As used herein, the term "data set" refers to computer storable data. Non-limiting examples of a data set include a file (e.g., a document file, such as a word processing document or a Portable Document Format (PDF) file), a group of files, a database, a disk image, a datastore, a binary large object ("blob"), and a virtual storage container. In one example, a data set may be determined by a logical grouping of data objects (e.g., related documents or other files having a shared characteristic).

Systems disclosed and/or described herein may access the data set in a suitable context, such as part of a use case. For example, a user may initiate an upload of the data set to a cloud storage service (such as a remotely located system or platform). In one example embodiment, the systems disclosed and/or described herein may access the data set in connection with (e.g., prior to, as a part of, and/or subsequent to) uploading the data set to the cloud storage service. For example, a client-side agent program distributed by the cloud storage service provider may access the data set. As another example, a server-side application may access the data set in connection with the data set being received and/or post-processed by the cloud storage service (such as after being transferred from a local computing device).

In one example embodiment, such a cloud storage service may be implemented as a component or element of a hybrid cache architecture, such as one provided by the assignee of this disclosure. In another embodiment, such a cloud storage service may be implemented as a component or element of a SaaS or multi-tenant platform.

In some example uses of an embodiment of the disclosure, the systems disclosed and/or described herein may access the data set in connection with a request to enable or implement an integrity-checking (or verifying) capability for the data set (sometimes referred to as "stamping" the data set). For example, a cloud storage service may receive a request from a user to "stamp" the data set.

Additionally (or alternatively), a cloud storage service may identify a rule or policy that designates the data set as subject to being stamped, with the rule or policy based on a characteristic of the data set. The data set characteristic or characteristics that are part of the rule or policy may be expressed as one or more of multiple factors, including (as non-limiting examples) ownership of the data set, a storage priority assigned to the data set, a data type (e.g., a file type) of the data set, or metadata associated with the data set.

In one example, a rule or policy may specify that signed documents or executed agreements (e.g., digitally signed documents and/or scans of signed paper documents) be subjected to stamping. In some examples, a rule or policy may specify a time, a timing scheme, and/or a periodicity for stamping a data set (e.g., stamp the data set at a specified time, immediately after each modification, or once a year, as non-limiting examples).

In one example use case, the data set may include a collection of discrete data objects that the systems disclosed and/or described herein may access as a single, integral data set. For example, the systems disclosed and/or described herein may access a collection of files or documents as a data set. In such a situation, the systems disclosed and/or described herein may identify and access a list of files as the data set, a folder (or folder hierarchy) of files as the data set, a group of files pertaining to a single subject or project as the data set, and/or other arbitrary or logical grouping of data objects. In some situations or use cases, the disclosed system or systems may concatenate (or treat as concatenated) a collection of data objects (e.g., for purposes of generating a checksum).

Returning to FIG. 3, at step 320, one or more of the systems disclosed and/or described herein may function to generate a checksum of the data set. The term "checksum," as used herein, may refer to a checksum, fingerprint, hash, one-way function, or other process capable of serving a similar function or purpose.

A checksum of a data set may be used (for all practical purposes) to uniquely identify a data set in a precise state (i.e., with a negligible chance of unintended checksum collisions with other data sets (i.e., a checksum for a different data set unintentionally matching that of a document or data set), and with an intentional checksum collision with a specific data set being substantially infeasible to create)[1]. As one non-limiting example of a mechanism for generating a checksum, a checksum may be generated from a Secure Hash Algorithm 2 (SHA-2) function, such as, SHA-512.

[1] In one embodiment, the checksum generating algorithm used is SHA-512, which is considered collision resistant (meaning it is adequately unlikely for a collision to occur). There may be collisions, but the probability is so small, that for all practical purposes it is technically assumed to be collision-free. For example, the table at https://en.wikipedia.org/wiki/Birthday_problem#Probability_table demonstrates this behavior. For a 50% probability, one would need to do $1.4 \times 10^{77}$ attempts, which for all practical purposes is not possible.

An SHA checksum is a string of letters and numbers that represents a form of checksum, which may sometimes be referred to as a hash code. A checksum is a number computed from the contents of a file using an algorithm that processes the actual bytes in the file to generate the checksum. A "good" checksum algorithm is preferably fast to compute (even for large files) and functions to generate a unique checksum for each file.

Further, SHA-512 is a rigorous form of checksum. In a practical sense, no two files will have the same SHA 512 checksums. This allows using the SHA checksum process to uniquely identify a file and to determine if a change to the file has occurred since the file was originally stored. If two files have the same SHA-512 checksum, then it means (for practical purposes) they are exactly the same, byte-to-byte. If two files (or the same file at two different times) are different by even a single byte, then their checksums will not match.

As a non-limiting example, consider a contract between two parties where Party A provides a service to Party B and charges a fee of $100,000. If a digital document is drafted and signed by the parties and its checksum computed, then the checksum can be used to verify the contents of the document at a time in the future. If someone were to tamper with the document and remove a single zero from "$100,000", or add a single space, the new document's checksum would not match with the one generated previously, thereby conclusively indicating that the document had been altered.

Systems disclosed and/or described herein may generate a checksum in a suitable context or situation. For example, the systems may generate the checksum of a data set responsive to a request to stamp the data set. In some examples, a client-side module may generate the checksum of a data set. Additionally (or alternatively), a server-side module may generate the checksum of a data set.

In one example implementation and use, a data set verification process may include the following steps or stages:
  accessing a data set;
  generating a checksum of the data set at the client side;
  uploading the data set to a cloud-storage system;
    where in some embodiments, the checksum and a data set identifier are stored on a blockchain;
  downloading the data set from the cloud-storage system at a later time;
    where this may be assisted by use of a data set identifier or address stored with the checksum;
      where in some embodiments, the checksum and data set identifier are stored on a blockchain;
  regenerating the checksum of the data set at the client side from the downloaded data set for purposes of verifying the authenticity of the downloaded data set; and
  determining if the data set as originally uploaded has been altered or corrupted by comparing the originally generated checksum to the later generated checksum.

Returning to FIG. 3, at step 330, one or more of the systems disclosed and/or described herein may generate a payload that includes the checksum of the data set and an identifier of a stored instance of the data set. In one embodiment, the identifier may be a link or address of a storage location, such as a URL corresponding to a location of a stored instance of the data set on a remote storage system or platform. In one embodiment the data set identifier may be an alphanumeric character string used by the remote storage system.

The stored instance of a data set may be in a suitable location or context. In one non-limiting example, the stored instance of a data set may be in a cloud storage environment and implemented using a cloud storage service (such as a hybrid or hybrid-cache architecture, or multi-tenant or SaaS system or platform). The stored instance of the data set would presumably be stored by the cloud storage system in its original form (i.e., intact and unchanged, except in cases of tampering and/or data storage system errors).

In one example, the stored instance of a data set may be a logical instance of the data set. For example, the cloud storage environment may store the data set in one or more contexts or versions, some of which may change over time. These may include one or more of using a single physical storage device or multiple physical storage devices, compressed or uncompressed versions of data, encrypted or unencrypted versions of data, deduplicated versions of data or not, as non-limiting examples. In each example, a stored instance of a data set would be expected to represent a logically unchanging storage of the data set that is accessible by a client device or process of the cloud storage environment or system.

An identifier of the stored instance of a data set may include one or more types of data used to uniquely identify the stored instance of the data set. For example, the identifier of a stored instance of a data set may include an identification number and/or an alphanumeric identification string that identifies the document (e.g., corresponding to a location within a cloud storage environment that stores an instance of the data set).

Additionally (or alternatively), a payload may include a logical storage location of an instance of a data set (e.g., a uniform resource locator identifying the data set), either as the identifier of the stored instance of the data set or accompanying the identifier of the stored instance of the data set in the payload.

In some embodiments, the payload may include a timestamp associated with a checksum of a data set. For example, the payload may include a timestamp of when the checksum of a data set was generated. Additionally (or alternatively), the payload may include a timestamp of when a data set was accessed (e.g., just prior to generating the checksum). In some embodiments, the payload may include a timestamp of when an instance of a data set was uploaded to a document store (e.g., to a cloud storage system).

In some embodiments, the disclosed and/or described system(s) and method(s) may create a data packet that contains one or more of a document ID (e.g., a name, alphanumeric identifier, or number, as non-limiting examples), the URL of the location of the document in a document store, a checksum generated from the document, and a timestamp indicating when the checksum was generated. Next, the system(s) and method(s) commit a transaction with the data packet as payload to a public blockchain.

The transaction on the blockchain is now an immutable and tamper proof record that a document with ID (X) had a checksum value of (Y) as generated at a time (Z). Using this information, at a later time a user can download the document from the document store using the URL on the blockchain, compute its checksum, and compare it to the value stored on the blockchain. This enables the user to determine if the downloaded version is the same as the original document that was stored, or if it has been altered or corrupted.

Returning to FIG. 3, at step 340, one or more of the systems disclosed and/or described herein may commit a transaction including the payload to a blockchain. As used herein, the term "blockchain" may refer to a consensus-based and/or distributed digital system of records. In some embodiments, the blockchain may be a public blockchain (e.g., a blockchain that is publicly shared and accessible among diverse users). Thus, the blockchain may exhibit (Byzantine) fault tolerance through one or more consensus mechanisms controlling write access that are orchestrated by the blockchain. The users, having separate interests in the blockchain, may be motivated to cooperate in consensus rather than undermine the integrity of the blockchain. As a result, the records in a large, highly distributed public blockchain are typically considered immutable for most practical purposes.

Systems disclosed and/or described herein may include a payload in a transaction in a suitable manner. For example, these systems may encode the payload within one or more parameters and/or fields of the transaction, typically in a transaction record or log.

In some embodiments, a system may be caused to include the payload as part of a transaction executed in whole or in part by a "smart contract". As used herein, the term "smart contract" may refer to a program and/or protocol that is executed via a blockchain. In one embodiment of the disclosure, a smart contract is a program (a set of executable instructions) which, once created, resides permanently on a public blockchain. Since it is stored on a public blockchain, once committed, the logic flow represented by the instructions cannot be changed. In some embodiments, the systems disclosed and/or described herein may include the payload in a transaction by execution of a smart contract that functions to store the payload on a blockchain (e.g., in custom fields defined by the smart contract).

In some embodiments, a system disclosed and/or described herein may structure a transaction such that a part or all the payload is captured (recorded) in a transaction log of a blockchain rather than stored within the blockchain itself. In one example embodiment, this alternative might include storing a transaction ID and/or a checksum or hash of a document in a transaction log (thereby enabling a user to check if a particular transaction ID in a log has an older date and has the same checksum which the file currently being evaluated possesses).

In one embodiment, the disclosed smart contract may enable two primary functions through the execution of instructions or a protocol stored on a blockchain:
1. Set function: Storing the SHA-512 checksum of a file for a given file (where files will be represented by their per object unique object identifier); and
2. Get function: Ability to query the object-id of a file and retrieve the stored checksum.

A smart contract stores this program data (i.e., a mapping between the object-id and checksum) on the public ledger or blockchain. The inherent features of a blockchain ensure that the stored data is not tampered with or manipulated. The smart contract is associated with an address on the blockchain and at that address an embodiment can execute one or more of the functions represented by (or in) the smart contract.

As a non-limiting example, the following process flow represents an implementation and use of an embodiment of the disclosure:
 A user stores a file with a system or platform that implements an embodiment of the disclosure and decides to "stamp" it;
 The system or platform may include both a client-side process and a remote platform-side process, where the platform includes a remote (i.e., cloud) storage capability;
 The system or platform calculates a SHA-512 checksum of that file and stores the specific object-id of that file and the checksum on a public blockchain using the disclosed smart contract functions;
 At a later time, a user (the same or another user) downloads the file, calculates the SHA-512 checksum, and compares it with the checksum stored on the blockchain for the indicated file as part of using the smart contract, where:
  A matching checksum ensures that the file stored by the system or platform was not altered or modified between the time it was uploaded/stored and accessed/downloaded by the user.

In addition to committing the payload, in some embodiments the systems disclosed and/or described herein may provide, transmit, and/or record (store) information about the payload. For example, systems disclosed and/or described herein may record information relating to the payload as metadata associated with the stored instance of a data set. Additionally (or alternatively), these systems may provide information relating to the payload to an owner of the data set and/or to one or more parties that store and/or manage the data set. The information relating to the payload may include information identifying a function (and in some cases one or more parameters of the function) used to generate the checksum. Additionally (or alternatively), the information relating to the payload may include information identifying the blockchain used and/or identifying the payload within the blockchain (e.g., an identifier of the transaction used to commit the payload to the blockchain).

Once a payload is committed to a blockchain, the systems disclosed and/or described herein are able later to validate the integrity of the stored instance of the data set (such as a document) using the checksum stored on the blockchain. While some examples disclosed or provided herein are directed to validating the integrity of data stored in a cloud storage system, the systems and methods disclosed and/or described herein may be used to validate the integrity of stored data in other contexts or environments.

For example, an organization may use an embodiment of the systems disclosed and/or described herein to "stamp" its own data for later use in verifying or confirming data integrity (which may be impacted by internal tampering, external attacks, or storage errors, as non-limiting examples). In one example, an organization may use the systems disclosed and/or described herein to stamp data that is (or may become) subject to legal discovery or an investigation to demonstrate to third parties that the data has not been tampered with or altered.

Figure 4:
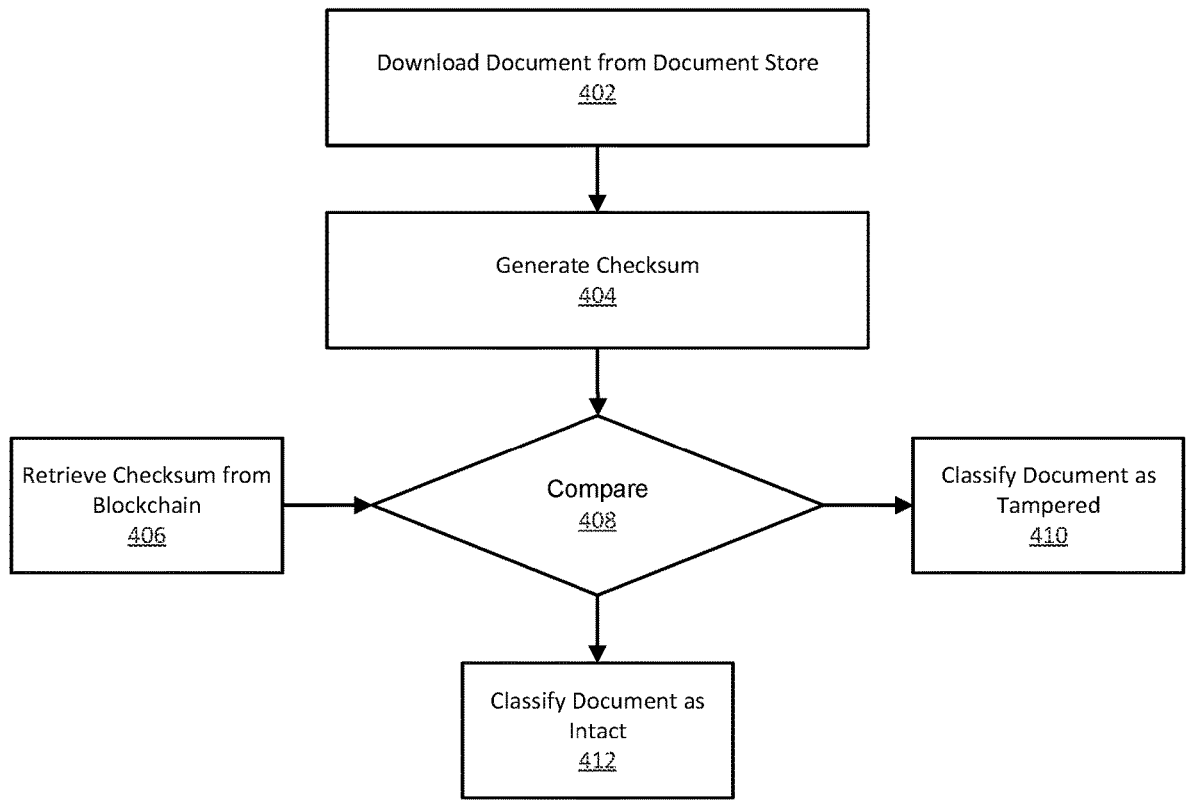
FIG. 4 is a flow chart or flow diagram illustrating steps, stages, operations, functions, or processes that may be implemented as part of an embodiment of the disclosed method for providing blockchain-based cloud storage document integrity.

FIG. 4 illustrates an example method 400 for testing/verifying the integrity of a document that has been stored in a document store (e.g., in case the security of the document store is not certain). As shown in FIG. 4, at step 402 systems disclosed and/or described herein may download the document from a document store. At step 404, these systems may generate a checksum from the downloaded document. These systems would typically generate the checksum using the same function (and, e.g., parameters) as was previously used to generate a checksum for the payload that was committed to the blockchain.

At step 406, these systems may retrieve the original checksum from the blockchain (e.g., using metadata stored by the document store in association with the document and/or data stored locally to identify the corresponding transaction of the blockchain). At step 408, these systems may compare the original checksum with the checksum generated at step 404. At step 410, and if the checksums do not match, the system will classify the document as being tampered with. Alternatively, at step 412, if the checksums do match, the system will classify the document as intact and unaltered.

The computing devices and systems disclosed and/or described herein broadly represent a type or form of computing device or system capable of executing computer-readable instructions, such as those contained within the modules disclosed and/or described herein. In a basic configuration, these computing device(s) may each include at least one memory device and at least one physical processor.

In some examples, the term "memory device" generally refers to a type or form of volatile or non-volatile storage device or medium capable of storing data and/or computer-readable instructions. In one example, a memory device may store, load, and/or maintain one or more of the modules disclosed and/or described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or other suitable storage memory.

In some examples, the term "physical processor" generally refers to a type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or other suitable physical processor.

Although illustrated as separate elements, the modules disclosed and/or described herein may represent portions of a single module or application. In addition, in certain embodiments one or more of these modules may represent one or more software applications or programs that, when executed by a processor in a computing device, may cause the computing device to perform one or more tasks. For example, one or more of the modules disclosed and/or described herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally (or alternatively), one or more of the modules recited herein may transform a processor, volatile memory, non-volatile memory, and/or other portion of a physical computing device from one form to another by executing on the computing device, storing data on the computing device, and/or otherwise interacting with the computing device.

In some embodiments, the term "computer-readable medium" generally refers to a form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example and can be varied as desired. For example, while the steps disclosed and/or described herein may be shown or discussed in a particular order, these steps do not necessarily need to be performed in the order illustrated or discussed. The various exemplary methods disclosed and/or described herein may also omit one or more of the steps described or illustrated herein or include additional steps in addition to those disclosed.

The preceding description has been provided to enable others skilled in the art to best utilize various aspects of the exemplary embodiments disclosed herein. The exemplary descriptions are not intended to be exhaustive or to be limited to a precise form disclosed. Many modifications and variations are possible without departing from the spirit and scope of the present disclosure. The embodiments disclosed and/or described herein should be considered in all respects illustrative and not restrictive. Reference should be made to the claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A computer-implemented method comprising:
    accessing an electronically stored data set;
    generating a checksum of the accessed data set;
    creating a payload comprising
        the generated checksum of the data set; and
        an identifier for the data set;

downloading a stored instance of the data set;
generating a recomputed checksum of the downloaded stored instance of the data set; and
prior to committing a transaction, validating the stored instance of the data set by comparing the checksum of the data set with the recomputed checksum of the downloaded stored instance of the data set; and
committing the transaction comprising the payload to a blockchain.

2. The computer-implemented method of claim 1, wherein the identifier of the data set comprises at least one of:
a document identifier designating a stored instance of the data set; and
a uniform resource locator designating the stored instance of the data set.

3. The computer-implemented method of claim 1, wherein the blockchain records a time of the transaction.

4. The computer-implemented method of claim 1, wherein the payload further comprises at least one of:
a time at which the checksum of the data set was generated;
a time at which the data set was accessed; and
a time at which the electronically stored data set was uploaded to a document store.

5. The computer-implemented method of claim 1, wherein the data set comprises a document file or a set of document files with a common attribute.

6. The computer-implemented method of claim 1, wherein the stored instance of the data set is located in an element of a remote server or platform.

7. The computer-implemented method of claim 1, further comprising storing a transaction identifier of the transaction in association with a stored instance of the data set.

8. The computer-implemented method of claim 7, further comprising:
receiving a request to verify integrity of the data set; and
in response to the request, retrieving and providing the transaction identifier.

9. A system comprising:
at least one electronic processor;
a non-transitory computer-readable memory comprising computer-executable instructions that, when executed by the processor, cause the system to:
access an electronically stored data set;
generate a checksum of the accessed data set;
create a payload comprising
the generated checksum of the data set; and
an identifier for the data set; and
commit a transaction comprising the payload to a blockchain;
wherein the instructions further cause the system to:
download a stored instance of the data set;
generate a recomputed checksum of the downloaded stored instance of the data set; and
prior to committing the transaction, validate the stored instance of the data set by comparing the checksum of the data set with the recomputed checksum of the downloaded stored instance of the data set.

10. The system of claim 9, wherein the blockchain records a time of the transaction.

11. The system of claim 9, wherein the payload further comprises at least one of:
a time at which the checksum of the data set was generated;
a time at which the data set was accessed; and
a time at which the electronically stored data set was uploaded to a document store.

12. The system of claim 9, wherein the data set comprises a document file or a set of document files with a common attribute.

13. The system of claim 9, wherein the stored instance of the data set is located in an element of a remote server or platform.

14. The system of claim 9, further comprising storing a transaction identifier of the transaction in association with a stored instance of the data set.

15. The system of claim 9, further comprising:
receiving a request to verify integrity of the data set; and
in response to the request, retrieving and providing the transaction identifier.

16. The system of claim 9, wherein the identifier of the data set comprises at least one of a document identifier designating a stored instance of the data set and a uniform resource locator designating the stored instance of the data set.

17. One or more non-transitory computer-readable media comprising one or more computer-executable instructions that, when executed by at least one processor of a computing device, cause the computing device to:
access an electronically stored data set;
generate a checksum of the accessed data set;
create a payload comprising
the generated checksum of the data set; and
an identifier for the data set; and
commit a transaction comprising the payload to a blockchain;
wherein the instructions further cause the system to:
download a stored instance of the data set;
generate a recomputed checksum of the downloaded stored instance of the data set; and
prior to committing the transaction, validate the stored instance of the data set by comparing the checksum of the data set with the recomputed checksum of the downloaded stored instance of the data set.

18. The non-transitory computer-readable medium of claim 17, wherein the payload further comprises at least one of:
a time at which the checksum of the data set was generated;
a time at which the data set was accessed; and
a time at which the electronically stored data set was uploaded to a document store.

\* \* \* \* \*